(12) United States Patent
Medra et al.

(10) Patent No.: US 11,489,616 B2
(45) Date of Patent: Nov. 1, 2022

(54) ADAPTIVE TRANSMISSION SCHEME FOR MEDIA-BASED MODULATION AND BEAMFORMING

(71) Applicants: Mostafa Medra, Kanata (CA); Mohammadhadi Baligh, Ottawa (CA)

(72) Inventors: Mostafa Medra, Kanata (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 17/066,989

(22) Filed: Oct. 9, 2020

(65) Prior Publication Data

US 2022/0116133 A1   Apr. 14, 2022

(51) Int. Cl.
H04L 1/00 (2006.01)
H04W 72/04 (2009.01)
H04B 7/06 (2006.01)
H04W 76/27 (2018.01)

(52) U.S. Cl.
CPC ......... H04L 1/0003 (2013.01); H04B 7/0617 (2013.01); H04B 7/0632 (2013.01); H04W 72/0406 (2013.01); H04W 76/27 (2018.02)

(58) Field of Classification Search
None
See application file for complete search history.

(56) References Cited

U.S. PATENT DOCUMENTS

| | | | | |
|---|---|---|---|---|
| 9,209,870 B1 * | 12/2015 | Nammi | ............... | H04B 7/0417 |
| 9,781,713 B2 * | 10/2017 | Zhu | .......... | H04L 43/16 |
| 2008/0117999 A1 * | 5/2008 | Kadous | ............... | H04B 7/0632 |
| | | | | 375/267 |
| 2015/0092768 A1 * | 4/2015 | Ng | ..................... | H04L 27/2692 |
| | | | | 370/350 |
| 2016/0182135 A1 * | 6/2016 | Onodera | ............... | H04L 1/0026 |
| | | | | 375/267 |
| 2017/0093474 A1 * | 3/2017 | Lee | ...................... | H04B 7/0632 |
| 2018/0132227 A1 * | 5/2018 | Ghosh | ................. | H04W 72/02 |
| 2019/0052441 A1 | 2/2019 | Nammi | | |

(Continued)

FOREIGN PATENT DOCUMENTS

| | | | | |
|---|---|---|---|---|
| AU | 2011265400 C1 * | 8/2013 | .......... | H04B 7/0417 |
| CN | 101039163 A | 9/2007 | | |
| WO | 2018056917 A1 | 3/2018 | | |

(Continued)

OTHER PUBLICATIONS

E. Basar, "Media-Based Modulation for Future Wireless Systems: A Tutorial," in IEEE Wireless Communications, vol. 26, No. 5, pp. 160-166, Oct. 2019, doi: 10.1109/MWC.2019.1800568. (Year: 2019).*

(Continued)

*Primary Examiner* — Charles C Jiang
*Assistant Examiner* — Biswajit Ghose

(57) ABSTRACT

Aspects of the present disclosure provide signalling that enables adaptively selecting a transmission scheme for different scenarios. Examples of the transmission schemes that may be selected from include beamforming, a channel modulation transmission scheme, (such as media-based modulation (MBM) or spatial modulation (SM)) or a hybrid of those two transmission schemes. The methods provided herein may apply to uplink, downlink, sidelink or backhaul scenarios.

20 Claims, 7 Drawing Sheets

(56) References Cited

U.S. PATENT DOCUMENTS

2019/0199415 A1* 6/2019 Zhu ................... H04L 1/06

FOREIGN PATENT DOCUMENTS

| WO | WO 2018/056917 A1 * | 3/2018 | ........... H04L 1/0643 |
| WO | WO-2018056917 A1 * | 3/2018 | ........... H04L 1/0643 |

OTHER PUBLICATIONS

E. Basar, "Media-Based Modulation for Future Wireless Systems: A Tutorial," in IEEE Wireless Communications, vol. 26, No. 5, pp. 160-166, Oct. 2019, doi: 10.1109/MWC.2019.1800568. (Year: 2019) (Year: 2019).*
Pillay, Narushan and Xu, Hongjun, "Quadrature spatial media-based modulation with RF mirrors", IET Communications, Nov. 2017, vol. 11, No. 16, pp. 2440-2448.
Lee, Ming-Chun and Chung, Wei-Ho, "Adaptive Multimode Hybrid Precoding for Single-RF Virtual Space Modulation With Analog Phase Shift Network in MIMO Systems", IEEE Transactions on Wireless Communications, Apr. 2017, vol. 16, No. 4, pp. 2139-2152.
Chen, Zhuo, et al., "Analysis of Transmit Antenna Selection/Maximal-Ratio Combining in Rayleigh Fading Channels", IEEE Transactions on Vehicular Technology, Jul. 2005, vol. 54, No. 4, pp. 1312-1321.
R1-1702246, Intel Corporation, "On NR Modulation Schemes", 3GPP TSG-RAN WG1 Meeting #88, Athens, Greece, Feb. 13-17, 2017, total 3 pages.

* cited by examiner

ADAPTIVE TRANSMISSION SCHEME FOR MEDIA-BASED MODULATION AND BEAMFORMING

TECHNICAL FIELD

The present disclosure relates generally to wireless communications, and in particular embodiments, an ability to choose between beamforming and media-based transmission schemes.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication. A wired or wireless communication from a first base station to a second base station is referred to as a backhaul communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

Media-based modulation (MBM) can be used to carry information in variations of the transmission media, i.e. the channel, in contrast to traditional wireless systems where information is embedded in amplitude, phase or frequency of a signal prior to being sent to an antenna. In more sophisticated systems, data can be transmitted through both conventionally modulated signal and channel variations. MBM can be realized by changing one or more radio frequency (RF) properties between the transmitter and receiver; e.g., permittivity, permeability and resistivity, of the propagation environment.

MBM is not the only system that sends data by varying the channel. Space shift keying (SSK) works in a similar way. In SSK, one of many antennas is turned on at the transmitter, and the receiver will obtain a distinctive vector corresponding to that transmit antenna. Similarly, a conventionally modulated symbol can be transmitted using an activated antenna of a set of antennas, which is called spatial modulation (SM).

MBM or SM hardware that is used for switching "on and off" can also be used for beamforming (BF). Beamforming is a technique that directs a wireless signal towards a particular receiving device, instead of allowing a signal to spread in a broader direction. Beamforming is an important aspect to the 5G networks. One technique for beamforming a signal involves utilizing multiple antennas in close proximity, all broadcasting a same signal at slightly different times. The overlapping transmitted waves produce interference that in some areas is constructive, making the signal stronger, and in other areas is destructive, making the signal weaker, or cancelling the signal.

However, neither MBM/SM nor beamforming work effectively over a wide range of parameters that affect system performance. For example, MBM works better than beamforming when many receive antennas are used. Beamforming works better for higher channel correlation. Beamforming requires less channel estimation overhead. MBM works better for higher transmission rate. Beamforming works better in lower SNR.

SUMMARY

Aspects of the present disclosure provide an adaptive system that can choose between a transmission scheme, such as MBM or SM, and a beamforming transmission scheme. In addition, methods of signalling are provided to enable such an adaptive system.

Providing a system with such adaptability of selecting a transmission scheme may allow for improved performance over a wide range of system parameters.

According to an aspect of the present disclosure, there is provided a method involving: receiving, by a first device, a reference signal for channel estimation; transmitting, by the first device, feedback information regarding a transmission scheme selected from beamforming and channel modulation transmission scheme; and transmitting, by the first device, configuration information for the selected transmission scheme pertaining to data transmission between the first device and a second device remote from the first device.

In some embodiments, the channel modulation transmission scheme is one of media based modulation (MBM) or spatial modulation (SM).

In some embodiments, at least one of the transmitting the feedback information or the transmitting configuration information includes transmitting the feedback information or the configuration information in: uplink control information (UCI); downlink control information (DCI); and radio resource control (RRC) messages.

In some embodiments, the transmitting the feedback information includes at least one of: i) a) deciding, by the first device, the selection of the transmission scheme; and b) transmitting, by the first device, the selected transmission scheme; ii) transmitting, by the first device, a recommended selection for the transmission scheme; or iii) transmitting, by the first device, information for use in adaptively determining the transmission scheme.

In some embodiments, the configuration information pertaining to data transmission includes: for a channel modulation transmission scheme, some or all indices from a set of all possible indices of the second device and corresponding channel quality information (CQI); for beamforming, a selected index from a set of all possible indices of the second device and corresponding CQI; or a hybrid selection of indices, from a set of all possible indices of the second device, suitable for a channel modulation transmission scheme and conventional modulation.

In some embodiments, the transmitting configuration information is for one of: uplink (UL) data transmission between the first device that is a base station and the second device that is a user equipment (UE); downlink (DL) data transmission between the first device that is a UE and the second device that is a base station; sidelink (SL) data transmission between the first device that is a UE and the second device that is another UE; or backhaul data transmission between the first device that is a base station and the second device that is another base station.

In some embodiments, the method further involves receiving, by the first device, at least one of: confirmation regarding an adaptively determined transmission scheme selected from beamforming and a spatial transmission scheme by the first device; a decision from the second device overruling the receiver decision; or a decision from the second device based on the receiver feedback.

In some embodiments, the transmission scheme is selected based on one or more parameters of a plurality of parameters comprising: signal-to-noise ratio (SNR); number of receive antennas; channel correlation; coherence time; and transmission rate.

According to an aspect of the present disclosure, there is provided an apparatus including a processor and a computer-readable medium having stored thereon computer executable instructions. The computer executable instructions when executed cause the apparatus to: receive a reference signal for channel estimation; transmit feedback information regarding an adaptively determined transmission scheme selected from beamforming and a channel modulation transmission scheme; and transmit configuration information for the selected transmission scheme pertaining to data transmission between the apparatus and another apparatus.

In some embodiments, the channel modulation transmission scheme is one of media based modulation (MBM) or Spatial modulation (SM).

According to an aspect of the present disclosure, there is provided a method including: transmitting, by a first device, a reference signal for channel estimation; receiving, by the first device, feedback information regarding an adaptively determined transmission scheme selected from beamforming and a channel modulation transmission scheme; and receiving, by the first device, configuration information for the selected transmission scheme pertaining to data transmission between the first device and a second device.

In some embodiments, the channel modulation transmission scheme is one of media based modulation (MBM) or Spatial modulation (SM).

In some embodiments, the at least one of the transmitting the feedback information or the transmitting configuration information includes transmitting the feedback information or the configuration information in: uplink control information (UCI); downlink control information (DCI); and radio resource control (RRC) messages.

In some embodiments, the receiving the feedback information includes at least one of: receiving, by the first device, the selected transmission scheme; or receiving, by the first device, a recommended selection for the transmission scheme; or receiving, by the first device, channel state information for use in adaptively determining the transmission scheme.

In some embodiments, the configuration information pertaining to data transmission includes: for a channel modulation transmission scheme, some or all indices from a set of all possible indices of the first device and corresponding channel quality information (CQI); for beamforming, a selected index from a set of all possible indices of the first device and corresponding CQI; or a hybrid selection of indices, from the set of all possible indices of the first device, suitable for a channel modulation transmission scheme and conventional modulation.

In some embodiments, the receiving configuration information pertaining to data transmission between the second device and the first device is for: uplink (UL) data transmission between the first device that is a user equipment (UE) and the second device that is a base station; downlink (DL) data transmission between the first device that is a base station and the second device that is a UE; backhaul data transmission between the first device that is a base station and the second device that is another base station; or backhaul data transmission between the first device that is a base station and the second device that is another base station.

In some embodiments, the method further involves transmitting, by the first device, confirmation regarding an adaptively determined transmission scheme selected from beamforming and the spatial transmission scheme.

In some embodiments, the transmission scheme is selected based on one or more parameters of a plurality of parameters including: signal-to-noise ratio (SNR); number of receive antennas; channel correlation; coherence time; and transmission rate.

In some embodiments, the method further involves deciding, by the first device, the selection of the transmission scheme.

According to an aspect of the present disclosure, there is provided an apparatus including a processor and a computer-readable medium having stored thereon computer executable instructions. The computer executable instructions when executed cause the apparatus to: transmit a reference signal for channel estimation; receive feedback information regarding an adaptively determined transmission scheme selected from beamforming and a channel modulation transmission scheme; and receive configuration information for the selected transmission scheme pertaining to data transmission between the apparatus and another apparatus.

In some embodiments, the channel modulation transmission scheme is one of media based modulation (MBM) or Spatial modulation (SM).

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1A:
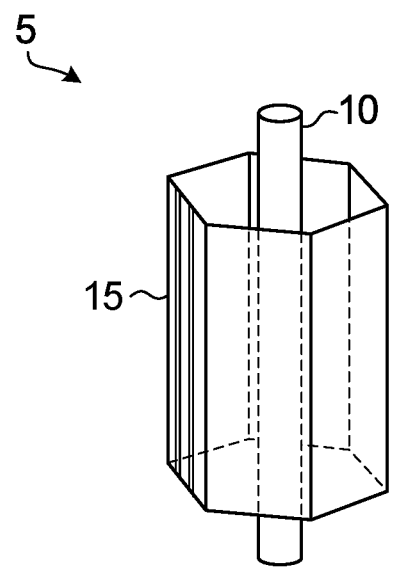
FIG. 1A is a schematic diagram of an antenna that can be used to perform MBM and beamforming according to an aspect of the disclosure.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

As indicated above, MBM can be realized by changing one or more radio frequency (RF) properties between the transmitter and receiver; e.g., permittivity, permeability and resistivity, of the propagation environment. A common way to do so is by using tunable parasitic elements/objects external to the antenna. An RF mirror with an ON/OFF switch, that can allow/prevent the incident wave to pass through it transparently, can be used for this purpose. The RF mirrors are activated according to a mirror activation pattern (MAP) to convey information and the receiver may be trained for those patterns before communication starts.

The advantages of MBM include being a simple transmission scheme. Only one RF chain is required in its simplest form. Also, constellation size can be increased by increasing the RF mirrors. More importantly, the performance significantly improves when the receiver is equipped with multiple antennas.

While MBM tries to change the channel between the transmitter and receiver by changing one or more RF properties, SM changes the channel by turning one antenna from a set of transmitting antennas ON and OFF. Accordingly, these two have a similar resulting effect, but different technology is used to achieve the effect. These two transmission schemes are generally referred to in this document as channel modulation transmission schemes. In the case of the MBM, the RF properties of devices after transmission at the antenna being changed modifies the channel between the transmitter and receiver. In the case of the SM, turning antennas ON and OFF modifies the channel between the transmitter and receiver.

When using MBM, an RF MAP can be selected that corresponds to the channel of the largest magnitude and uses that pattern while sending data using conventional methods with known transmission constellations; e.g., QAM. Similarly for SM, an antenna can be selected resulting in a channel of a largest magnitude. In this case the receiver will demodulate the signal in a simpler way as compared to MBM or SM complex receivers.

Both MBM and SM are considered as index modulation schemes. In the case of MBM, RF mirrors are used that can be turned ON or OFF, thereby generating various MAP patterns. Each transmitter may have a set of multiple different MAPs that can modify the channel between the transmitter and receiver, Each MAP pattern can be associated with a number or index. As a result, each transmitter has a set of indices that used to identify the respective MAPs. When an index that corresponds to a certain MAP is used, this selection results in a channel that is being used to convey information which is why this is referred to as an index modulation scheme. Similarly, in SM, each transmitter may have a set of multiple different antennas that can be turned On and OFF to modify the channel between the transmitter and receiver. Each antenna can be associated with a number or index. As a result, each transmitter has a set of indices that used to identify the respective antennas. the index can refer directly to the antenna being used for transmission. There are other generalized schemes for both MBM and SM, and the term index modulation is similarly used for referring to each possible choice of MAP or antenna(s). In the following portions of the description use of the term "index" or "indices" is generally used to refer to values associated with one of a set of various MAPs for MBM or one of a set of various antennas arrangements that indicates how one or more antenna are ON or OFF for SM.

The problem is that neither MBM/SM (generally any system sends information through spatial vectors) nor beamforming work efficiently over wide range of system parameters. For example, MBM/SM work well for a particular range of a given parameter, while beamforming works well for a different range of that parameter, while there may or may not be some overlap between the two ranges. Furthermore, the ranges of best efficiency may be different for different parameters. The parameters may include signal to noise ratio (SNR), number of receive antennas, channel correlation, coherence time and transmission rate. Aspects of the present disclosure objective propose an adaptive system that can choose between spatial modulation transmission schemes and beamforming transmissions schemes, Signalling mechanisms are also provided for enabling such an adaptive system.

FIG. 1A illustrates an example for a transmitter antenna 5 that may be implemented for MBM. In the example of FIG. 1A, an antenna 10 is surrounded by six RF elements 15; e.g., RF mirrors, that can be switched ON/OFF to change the channel between the transmitter antenna 5 and a receiver. While six RF elements 15 are shown in FIG. 1A, there could be more or less than six RF elements.

Figure 1B:
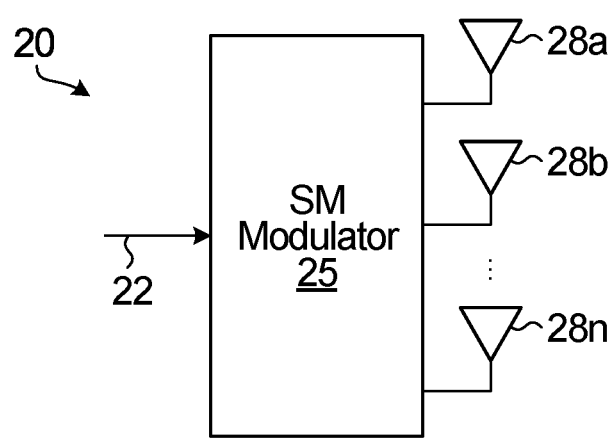
FIG. 1B is a schematic diagram of an SM antenna that can be used to perform spatial modulation and beamforming according to an aspect of the disclosure.

FIG. 1B illustrates an example of a transmitter 20 that is used for SM. FIG. 1B shows that the transmitter 20 is equipped with an input 22 to provide a signal to an SM modulator 25 and multiple antennas 28*a*, 28*b*, . . . 28*n*. As described previously, turning ON and OFF antennas can change the transmitter-receiver channel.

Figure 2:
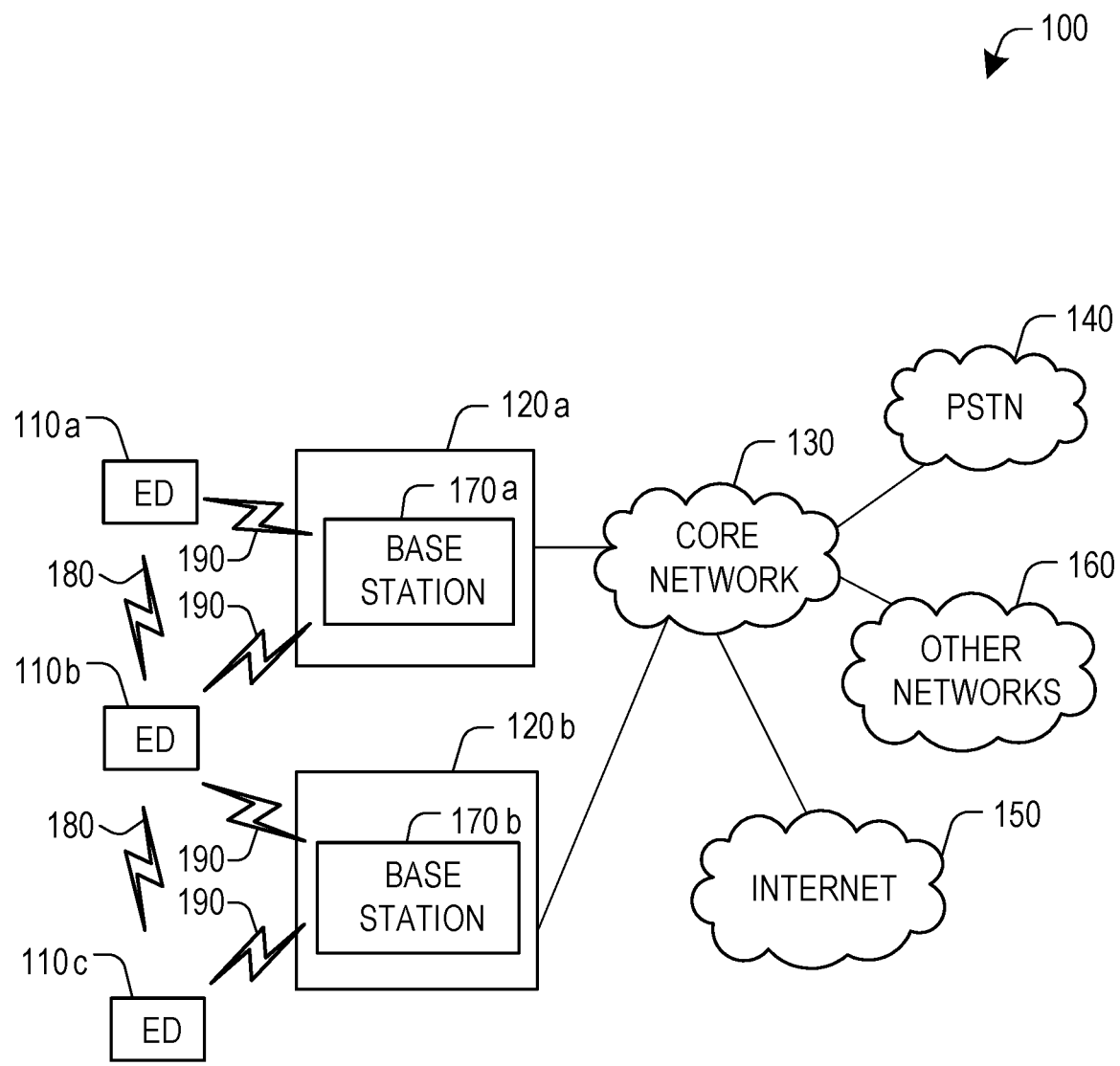
FIG. 2 is a schematic diagram of a communication system in which embodiments of the disclosure may occur.
Figure 3A:
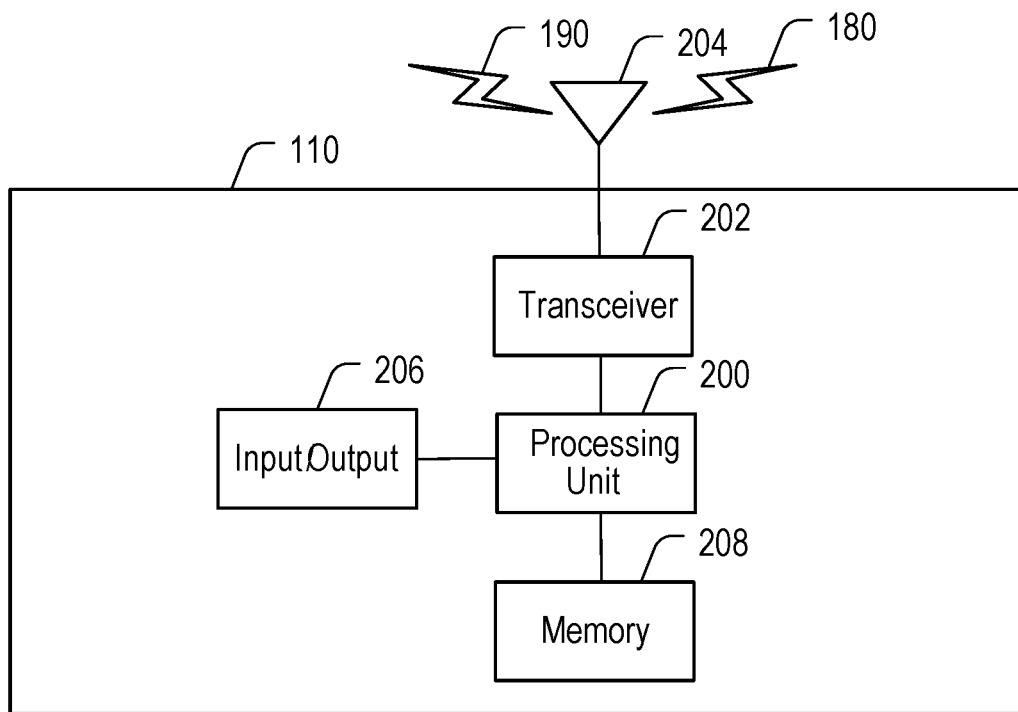
FIGS. 3A and 3B are block diagrams of an example user equipment and a base station.
Figure 3B:
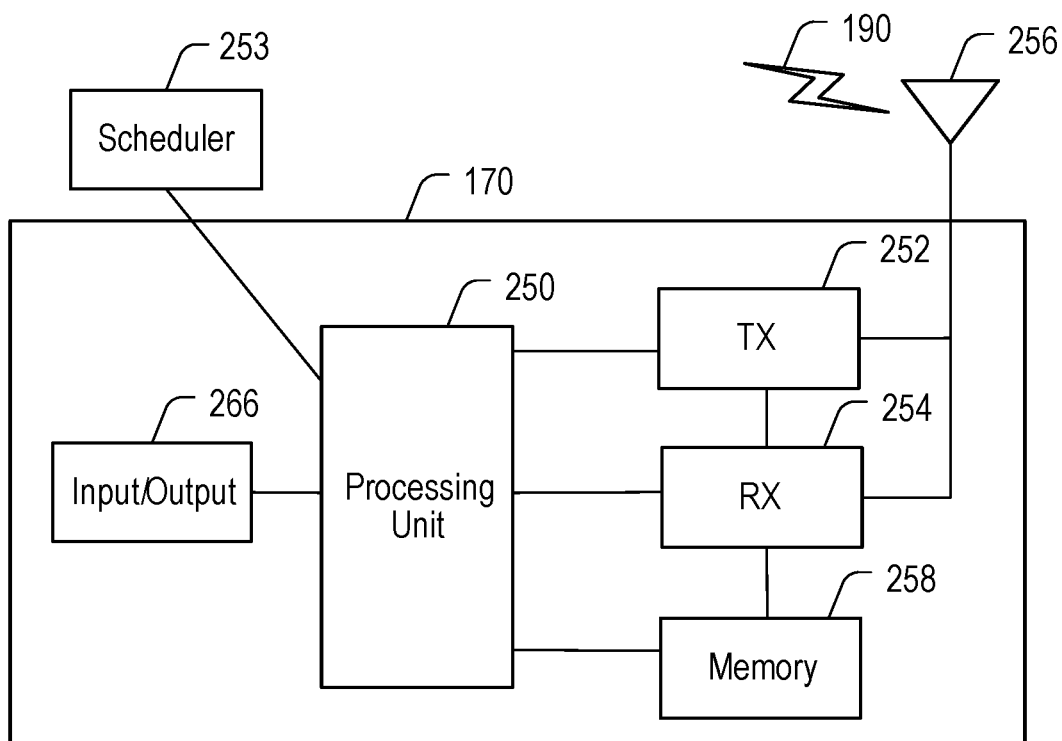

FIGS. 2, 3A and 3B following below provide context for the network and devices that may be in the network and that may implement aspects of the present disclosure.

FIG. 2 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, consumer electronics device, Internet of Things (IoT) device, wearable device, or vehicular device (or vehicle-mounted device, vehicle on-board equipment).

In FIG. 2, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), a wireless router. The base stations also could be a satellite base station, or airborne station such as unmanned aerial vehicle (drones), or mobile base station. Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the functionality and/or embodiments described herein. In the embodiment shown in FIG. 2, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Uplink Packet Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Each transmitter that uses MBM to transmit data can be equipped with RF mirrors like those shown in FIG. 1A, or other RF units that can change the channel between the transmitter and receiver. The transmitter unit can be a base station or UE. Each transmitter that uses SM or SSK is equipped with multiple antennas like those shown in FIG. 1B. The transmitter can be a base station or UE.

Additional details regarding the UEs 110 and the base stations 170 are known to those of skill in the art. As such, these details are omitted here for clarity.

Aspects of the disclosure will be made describing communications between two network nodes generally considered a transmitter and a receiver. In some embodiments, the transmitter and receiver may be referred to simply as a first device and a second device. The transmitter and receiver can each be either a network side device or a user device. For example, in an uplink scenario, the transmitter is a UE and the receiver is a base station. In a downlink scenario, the transmitter is a base station and the receiver is a UE. In a sidelink scenario, the transmitter is a UE and the receiver is another UE. In a backhaul scenario, the transmitter is a base station and the receiver is another base station.

Some embodiments described herein allow either of the devices, i.e. the transmitter or the receiver involved in the transmission scheme, to choose between different transmission schemes. That decision depends on various factors, some of which will be discussed below. In some embodiments, the decision for the transmission scheme, or a recommendation for the transmission scheme, may involve estimating performance metrics for the different transmission schemes based on parameters associated with the performance metrics. Then it is possible to select the transmission scheme having the best performance based on the estimated performance metrics.

A first factor pertains to parameters that affect a metric that affects the selection process. For example, if the decision of the transmission scheme is based on performance metrics, such as bit error rate (BER) or signal error rate (SER) for each transmission scheme. The performance metrics may depend on parameters such as the signal-to-noise ratio (SNR), features of the channel such as channel correlation and coherence time, a number of antennas at the receiver, transmission rate and how many bits are transmitted through spatial vectors and conventional constellations. While BER and SER are two performance metrics identified above, it should be understood that other performance metric may be considered as part of the transmission scheme selection process. If the decision is based on the transmitter and receiver determining mutual information and then the transmitter calculating how many bits can be sent, then the amount of overhead required for channel estimation and feedback may also be considered in the selection process. Since the transmitter and receiver used for MBM and SM are different than those of constellations used in conventional modulation, the transmitter and receiver hardware and software may also influence the decision. Because the channel between the transmitter and receiver should be known at the receiver to allow the receiver to decode the received MBM/SM signal, this can affect the channel estimation procedures according to whether a frequency division duplexing (FDD) system or a time division duplexing (TDD) system is used. In some embodiments, a differential form of MBM and SM, i.e. currently form of signal based on previously signal, may be used that does not need channel information at the receiver, but such an implementation may result in a certain amount of performance loss.

A second factor pertains to how often the decision is to be made. In some embodiments, it is possible to obtain the decision based on the current estimated channel, and to change the decision every time the channel changes. In some embodiments, it is possible to obtain the decision for the average system performance given other system parameters and long-term channel statistics. Therefore, the decision can be made on a short-term basis or a long-term basis. In other words, the decision can be transmitted in different time intervals based on the channel that carries the information. Depending on whether the decision is long-term or short-term affects signaling that occurs between the transmitter and receiver. For example, for a short-term based decision, which is based on instantaneous channel conditions, then the signaling can use downlink control information (DCI) messaging and uplink control information (UCI) messaging, which is basically physical layer control signaling. On the other hand, for a long-term based decision, which is based on longer-term channel statistics, the signaling of the decision can use, for example, radio resource control (RRC) messaging and use longer term statistics of the channel, such as, but not limited to, reference signal received power (RSRP) or reference signal received quality (RSRQ). Note that even if the decision is long term, short term feedback using DCI and UCI can be used in that process. For example, in the case of beamforming, the channel quality information (CQI) of the selected index may be used.

A third factor involves which device is making the decision. In some embodiments, the transmitter or the receiver can be responsible for the decision. In some scenarios, the network might make the decision for either the transmitter or the receiver. However, there are implications for each choice. For example, if the transmitter sends training sequences, then the channel can be determined at the receiver. Given that the receiver knows its own hardware and software capabilities, the receiver can then make the decision. However, if the decision is made at the transmitter, feedback from the receiver may be needed by the transmitter. In both cases, after the decision is made, the other party may confirm or overrule the decision. In some embodiments, a UE may not have the authority to overrule a decision made by a base station.

A fourth factor pertains to a type of link that is being used between the transmitter and receiver. Examples of different type of links include UL, DL, SL or backhaul. Depending on the type of link being used, the decision making may change. For example, in SL, which involves communication between two UEs, one of the two UEs can decide the transmission scheme, or the decision can be made by the network serving the UEs.

In some embodiments, the MBM switching time from one MAP to another (or with regard to SM, to switch from one antenna to another) can be different from a conventional signal generated by the transmitter. For example, the data stream from an MBM and SM capable device can be slower than that from conventional constellations generated by the transmitter. In some embodiments, the switching time depends on the technology of the device, for example the RF mirrors switching time for MBM. Other embodiments, for example that are based on SSK or SM, RF switches controlling the SSK and SM signalling can have a different switching speed from a conventional signal as well.

Pilot training used for channel estimation may also depend on whether a decision is short-term or long-term and the type of transmission scheme. For example, for beamforming with a long-term decision, the channel can be periodically estimated based on the strongest index only, or the few strongest indices, or all of them. Channel estimation may also depend on whether MBM or differential MBM is used.

Some aspects of the disclosure allow the system to take advantage of both types of transmission schemes, namely a channel modulation transmission scheme such as MBM or SM and beamforming.

In some embodiments, a hybrid combination of both conventional constellations and MBM or SM may be used simultaneously. For example, $2^M$ possible indices and $2^N$ QAM symbols, where M and N are integer values. In such a scenario, $2^K$ for K≤M+N combinations may be selected with best performance.

Aspects of the present disclosure provide signalling that enables adaptively selecting a transmission scheme for different scenarios. In addition to aspects of new signalling presented here, some aspects of conventional signalling that estimates a channel for all MAPs for MBM, or antennas for SM, may also be used.

While the portions of the disclosure below may particularly describe embodiments pertaining to MBM, and direct extensions to SM, it is to be understood that the concepts are valid for any system that uses any type of technique to change a channel vector between a transmitter and a receiver when transmitting data.

Given the number of possibilities shown above in terms of possible embodiments (i.e., long-term/short-term decision, FDD/TDD systems, decision made at the transmitter or receiver, UL/DL/sidelink/backhaul), several combinations of these possibilities will be described below and extensions to other possible cases follow analogous procedures.

FIGS. 4A to 4D describe four different examples of which device, a transmitter or a receiver, makes a decision or a recommendation for the transmission scheme for different UL, DL and SL scenarios. In FIGS. 4A to 4D only a single transmitter is included in the signal flow diagrams. However, in a real-world implementation there may be multiple transmitters or receivers in some scenarios. For example, there may be multiple UEs (acting as transmitters or receivers) in communication with a base station (acting as a respective receiver or transmitter) in a cell.

An embodiment that will now be described is for UL transmission and the decision is to be made by the receiver. Therefore, in such a UL case the transmitter is a UE and the receiver is the base station. The decision of which scheme to use is based on system parameters and long-term channel statistics such as signal to noise ratio (SNR), the number of receive antennas, features of the channel such as channel correlation and coherence time, transmission rate and how many bits are transmitted through spatial vectors and conventional constellations. The decision is not necessarily based on all of these features, but can be can based on some or all of these as appropriate. The decision is based on parameters that change slowly over time. In some embodiments, this decision is made by using parameter values that the receiver may already have or are a result of, for instance, the channel estimation process or other configuration information received from the transmitter, to estimate performance metrics and then selecting a preferred transmission scheme based on the estimated performance metrics. In some embodiments, the decision is made based on stored tables that may use parameters such as BER, SER or mutual information including performance metrics on which the modulation scheme is selected based on the system parameters. Receiver hardware may favour one of the metrics or one of the schemes over the other. For example, the receiver hardware may be computationally able to receive a certain number of MBM vectors. The spatial switching speed may be different from the conventional symbol rate.

In this embodiment, after channel estimation occurs, which includes pilots sent from the transmitter to the receiver, the receiver sends feedback information including a decision of which transmission scheme to use to the transmitter. The decision can be beamforming or a channel modulation transmission scheme, such as MBM or SM, or even a hybrid subset of some or all possible combinations of spatial and conventional constellations that could be effective for either transmission scheme. The transmitter, which in this case is the UE, may send information regarding its transmission capabilities to the receiver, which is the base station, to aid the receiver in the decision making process. Such information may be sent via RRC signaling. In each case, configuration information pertaining to data transmission is provided from the receiver to the transmitter to enable the transmitter to transmit the data to the receiver. For example, if beamforming is selected as the preferred transmission scheme, selected index, for example from a set of MAP indices, and CQI information to configure the transmitter are transmitted by the receiver. If MBM or SM is selected as the preferred transmission scheme, some or all indices to use in addition to CQI to configure the transmitter are transmitted by the receiver. For the hybrid case, one or more combinations of all the possible indices and constellations to configure the transmitter are transmitted by the receiver.

In some embodiments, the transmitter will reply to the receiver with confirmation that the selected transmission scheme will be used, or possibly to overrule the selected scheme. The transmitter may overrule the receiver decision due to software or hardware limitations. If the transmitter is a UE, the UE might not have the authority to overrule. After the decision is made, for subsequent cycles, the decision may be the same, but further configuration information is sent.

Figure 4A:
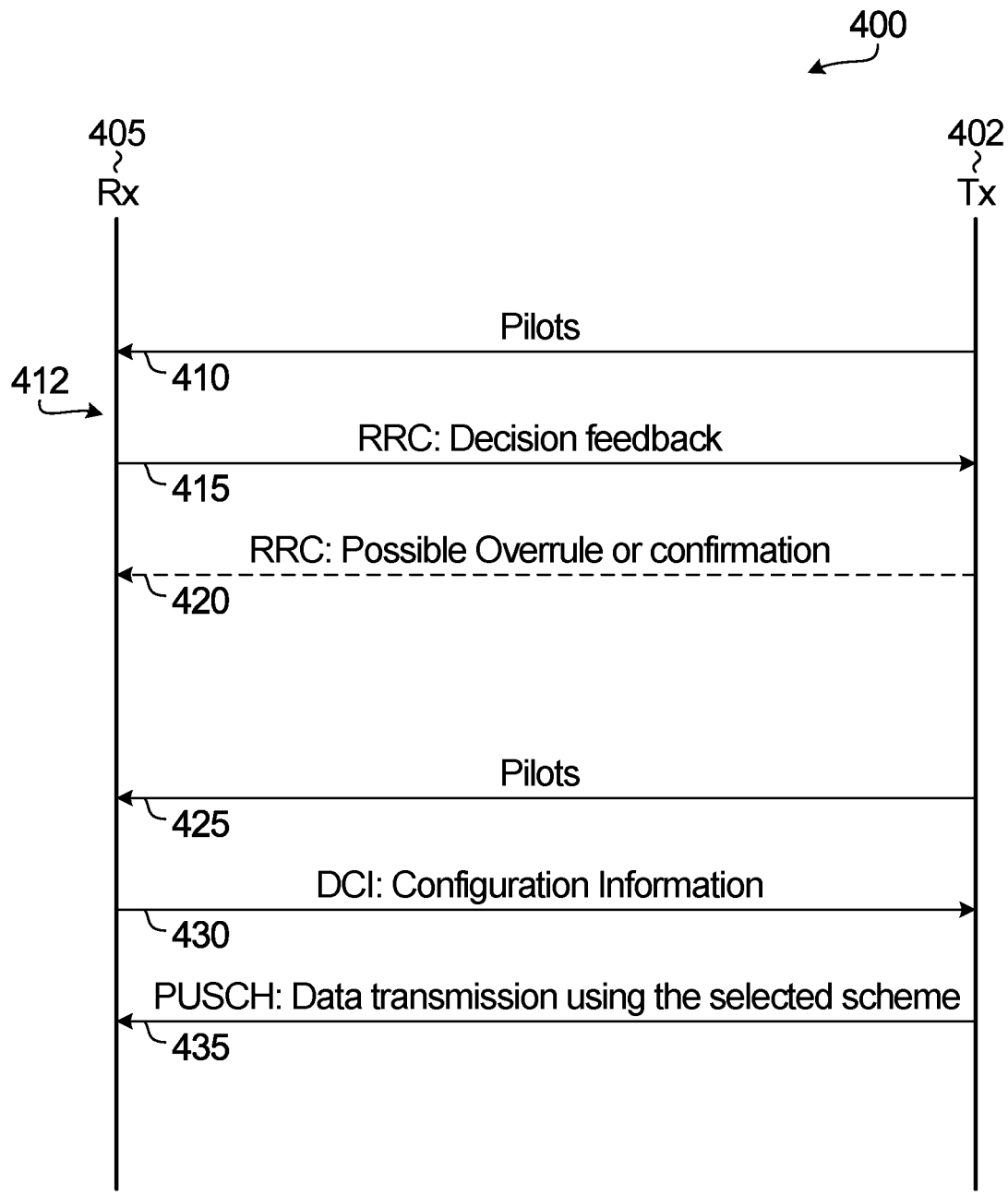
FIG. 4A is a signal flow diagram illustrating signaling between a transmitter and a receiver for adaptively selecting a transmission scheme by the receiver for an UL direction according to an aspect of the application.

FIG. 4A illustrates an example of signalling that may occur between a transmitter (Tx) 402 and receiver (Rx) 405 for a receiver-based decision for an UL. Therefore, in one embodiment, the transmitter 402 is a UE and the receiver 405 is a base station for the UL scenario. In another embodiment, the transmitter 402 is a first base station and the receiver 405 is a second base station for a backhaul scenario.

At step 410, the transmitter 402 sends a reference signal (for example, a pilot) that allows the receiver 405 to perform channel estimates for all indices, for example MAP indices for MBM and antenna indices for SM. In a particular non-limiting example, if there were four different MAP indices, corresponding to four different MAPs, reference signals could be sent in four distinct time slots for each of the respective MAPs for the channel estimation process. The receiver can perform the channel estimate for each MAP in each slot and use the results of the channel estimates, in part, in the decision-making process described in further detail below.

At step 412, the receiver makes a decision as to the type of transmission scheme. In some embodiments, the decision-making process involves using parameter values to estimate performance metrics and then selecting a transmission scheme based on the estimated performance metrics. The parameters may include system parameters and long-term channel statistics such as signal to noise ratio (SNR), the number of receive antennas, features of the channel such as channel correlation and coherence time, transmission rate and how many bits are transmitted through spatial vectors and conventional constellations. At step 415, the receiver 405 sends feedback information to the transmitter 402 as to the decision made by the receiver 405 as to which transmission scheme is to be used, beamforming or a channel modulation transmission scheme such as MBM or SM, or a hybrid of the two types. In the particular example shown, the feedback information is performed on a long-term basis and as such the feedback is sent in an RRC message. It should be understood that if the feedback information is sent on a short-term basis, the feedback information may be sent in DCI. At step 420, which is an optional step, the transmitter 402 may send a confirmation message or an overrule message of the receiver's decision. When the message is an overrule message indicating that the decision from the receiver is not being used, the overrule message may contain information regarding the transmission scheme to be used by the transmitter.

Step 425 includes the transmitter 402 sending additional pilots that allow the receiver 405 to perform further channel estimates for all indices. Steps 410, 412, 415 and 420 may be repeated periodically, or as desired, to ensure that the proper selection of transmission scheme is made for a particular point in time. These steps may be performed sometime after configuration information and data (steps 430 and 435) are sent the first time, either before a second time or whenever needed. In some embodiments, the additional pilots at step 425 may be a reduced number of pilots based on previous channel estimation and decision performed in steps 410, 412, 415 and 420.

At step 430, the receiver 405 sends configuration information to the transmitter 402, to configure the transmitter so the transmitter 402 can send the data to the receiver using the transmission scheme in the manner selected by the receiver 405, if confirmed, or an alternative manner if the selection is overruled. Therefore, if the transmission scheme is beamforming, the configuration information is used, in part, to configure the transmitter 402 to be able to transmit data to the receiver 405 using beamforming. If the transmission scheme is MBM or SM, the configuration information is used, in part, to configure the transmitter 402 to be able to transmit data to the receiver 405 using MBM or SM. The configuration information may be sent in a DCI when the configuration information is considered to be transmitted on a short-term basis. The configuration information is specific to the transmission scheme and therefore may be different depending on the transmission scheme. For example, for MBM or SM, the configuration information may include some or all indices and the CQI corresponding to each index. For beamforming, the configuration information may include a particular selected index and the CQI corresponding to the selected index. A further option may be the configuration information includes a hybrid selection from combinations of indices and conventional constellations. At step 435, the transmitter 402 can then transmit data to the receiver 405 in the physical uplink shared channel (PUSCH) in the manner selected by the receiver 405, if confirmed by the transmitter 402, or alternative scheme if the receiver decision is overruled.

Another embodiment for UL includes the decision being made by the transmitter instead of the receiver, which may include the transmitter sending reference signals, the receiver determining a channel estimate and sending channel state information (CSI) to the transmitter so the transmitter can make an informed decision. The transmitter can then inform the receiver about the decision and send data using a physical uplink shared channel (PUSCH).

Other embodiments similar to the above described UL example may include, instead of the decision being made at the receiver, a recommendation is made at the receiver and provided to the transmitter. A more detailed example of such an embodiment is described below with reference to FIG. 4B, but for a DL scenario.

Providing the system with this adaptability of selecting a transmission scheme may allow for improved performance over a wide range of system parameters. Selecting the transmission scheme may provide a better performance metric according to the system parameters and thereby using the transmission scheme that is better suited to the current parameters.

An embodiment that will now be described is for downlink transmission and a recommended selection is made by the receiver. The transmitter responds with a confirmation or an overrule message. Then for subsequent cycles, the decision may be the same for a period of time, but the configuration information may be resent on a more frequency basis as necessary.

Figure 4B:
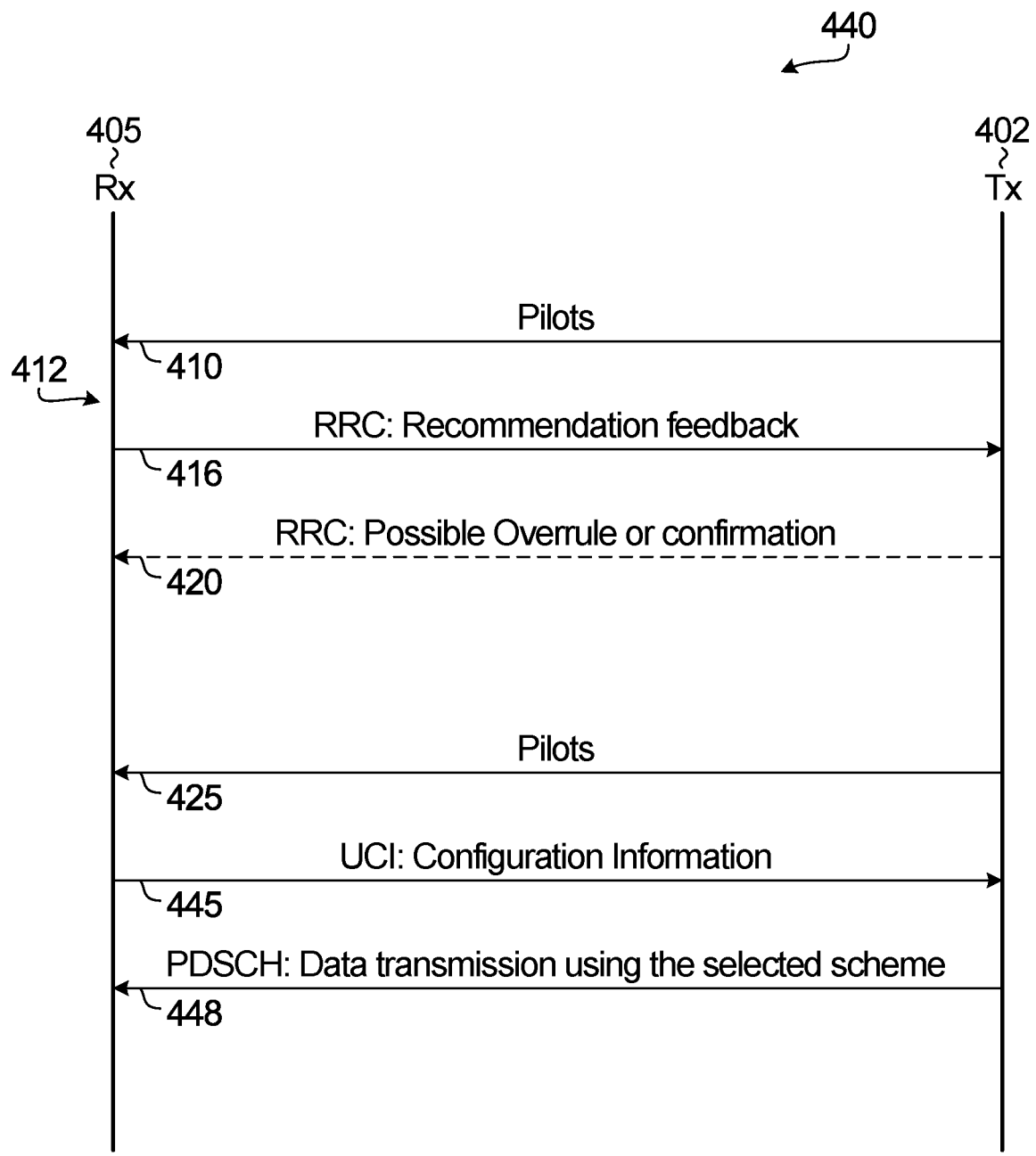
FIG. 4B is a signal flow diagram illustrating signaling between a transmitter and a receiver for adaptively recommending a transmission scheme by the receiver for a DL direction according to an aspect of the application.

FIG. 4B illustrates an example of signalling that may occur between a transmitter 402 and receiver 405 for a receiver-based recommendation for a DL. Therefore, in one embodiment, the transmitter 402 is a base station and the receiver 405 is a UE for the DL scenario. In another embodiment, the transmitter 402 is a first base station and the receiver 405 is a second base station for a backhaul scenario.

At step 410, the transmitter 402 sends a reference signal (for example, a pilot) that allows the receiver 405 to perform channel estimates for all indices, for example MAP indices for MBM and antenna indices for SM. At step 412, the receiver makes a recommendation as to the type of transmission scheme. In some embodiments, the recommendation process involves using parameter values to estimate performance metrics and then selecting a transmission scheme based on the estimated performance metrics. The parameters may include system parameters and long-term channel statistics such as signal to noise ratio (SNR), the number of receive antennas, features of the channel such as channel correlation and coherence time, transmission rate and how many bits are transmitted through spatial vectors and conventional constellations. At step 416, the receiver 405 sends feedback information to the transmitter 402 as to the recommendation made by the receiver 405 as to which transmission scheme to use, beamforming or a channel modulation transmission scheme such as MBM or SM or hybrid transmission. In the particular example shown, the feedback information is performed on a long-term basis and as such the feedback is sent in RRC messages. It should be understood that if the feedback information is sent on a short-term basis, the feedback information may be sent in UCI. At step 420, which is an optional step, the transmitter 402 may send a confirmation message for the recommendation or an overrule message of the receiver's recommendation. When the message is an overrule message indicating that the recommendation from the receiver is not being used, the overrule message may contain information regarding the transmission scheme to be used by the transmitter.

Step 425 includes the transmitter 402 sending additional pilots that allow the receiver 405 to perform further channel estimates for all indices. In some embodiments, the additional pilots 425 may be a reduced number of pilots based on previous channel estimation and decision performed in steps 410, 412, 416 and 420.

Steps 410, 412, 416 and 420 may be repeated periodically, or as desired, to ensure that the proper selection of transmission scheme is made for a particular point in time. These steps may be performed sometime after configuration information and data (steps 430 and 435) is sent the first time either before a second time, or whenever needed.

At step 445, the receiver 405 sends configuration information to the transmitter 402, so the transmitter 402 can send the data in the manner recommended by the receiver 405, if confirmed by the transmitter 402, or an alternative manner if the recommendation is overruled. Therefore, if the transmission scheme is beamforming, the configuration information is used, in part, to configure the transmitter 402 to be able to transmit data to the receiver 405 using beamforming. If the transmission scheme is MBM or SM, the configuration information is used, in part, to configure the transmitter 402 to be able to transmit data to the receiver 405 using MBM or SM. The configuration information may be sent in a UCI when the configuration information is considered to be transmitted on a short-term basis. The configuration information is specific to the transmission scheme and therefore may be different depending on the transmission scheme. For example, for MBM or SM, the configuration information may include some or all indices and the CQI corresponding to each index. For beamforming, the configuration information may include a particular selected index and the CQI corresponding to the selected MAP. A further option may be the configuration information includes hybrid selection from combinations of indices and conventional constellations. At step 448, the transmitter 402 can then transmit data to the receiver 405 in the physical downlink shared channel (PDSCH) in the manner recommended by the receiver 405, if confirmed by the receiver 405, or alternative scheme if the receiver decision is overruled.

Other embodiments similar to the above described DL example could be directed to a receiver making an explicit decision as opposed to a recommendation.

Providing the system with this adaptability may allow for improved performance over a wide range of system parameters. Selecting the transmission scheme may provide a better performance metric according to the system parameters and thereby using the transmission scheme that is better suited to the current parameters.

An embodiment that will now be described is for downlink transmission and a selection is made by the transmitter. The transmitter responds with a confirmation or an overrule message.

Figure 4C:
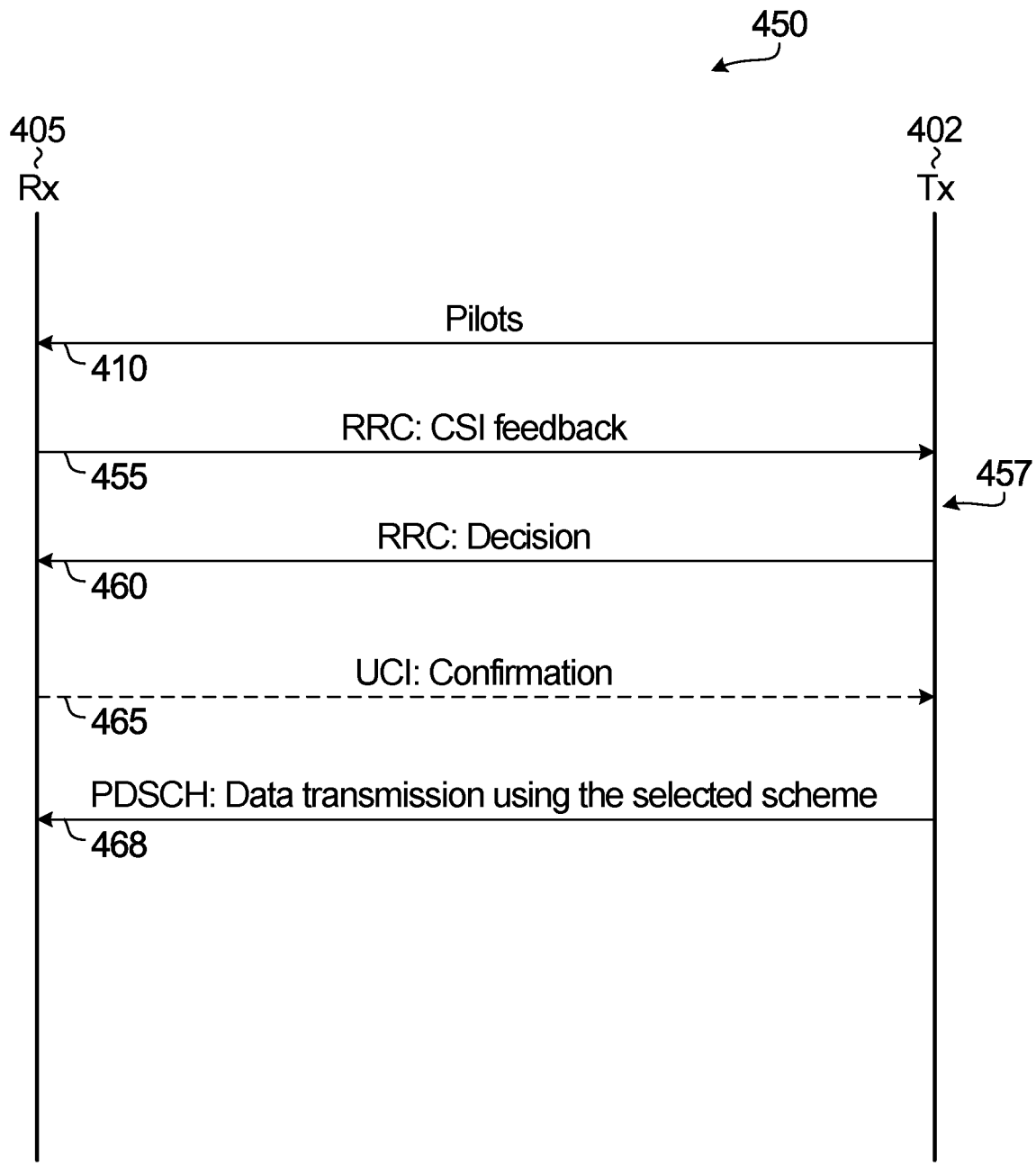
FIG. 4C is a signal flow diagram illustrating signaling between a transmitter and a receiver for adaptively selecting a transmission scheme by the transmitter for a DL direction according to an aspect of the application.

FIG. 4C illustrates an example of signalling that may occur between a transmitter 402 and receiver 405 for a transmitter directed selection for a DL scenario. Therefore, in one embodiment, the transmitter 402 is a base station and the receiver 405 is a UE for the DL scenario. In another embodiment, the transmitter 402 is a first UE and the receiver 405 is a second UE for a sidelink scenario.

At step 410, the transmitter 402 sends a reference signal (for example, a pilot) that allows the receiver 405 to perform channel estimates for all indices, for example MAP indices for MBM and antenna indices for SM. At step 455, the receiver 405 sends channel state information (CSI) feedback information to the transmitter 402 that can be used in part by the transmitter 402 to make the decision which transmission scheme should be used, beamforming or a channel modulation transmission scheme such as MBM or SM or a hybrid combination. In some embodiments, step 455 may also include information regarding the receiver 405 capabilities of the different transmission schemes. Step 455 may provide the transmitter 402 with information enabling the decision making and providing the required configuration information for that transmission. In the particular example shown, the feedback information is performed on a long-term basis and as such the feedback is sent in RRC messages. It should be understood that if the feedback information is sent on a short-term basis, the feedback may be sent in UCI.

At step 457, the transmitter makes a decision as to the type of transmission scheme. In some embodiments, the decision making process involves using parameter values to estimate performance metrics and then selecting a transmission scheme based on the estimated performance metrics. The parameters may include system parameters and long-term channel statistics such as signal to noise ratio (SNR), the number of receive antennas, features of the channel such as channel correlation and coherence time, transmission rate and how many bits are transmitted through spatial vectors and conventional constellations. At step 460 the transmitter 402 sends a decision message to the receiver 405 indicating the transmitter's decision as to which transmission scheme is being used.

At step 465, the receiver 405 optionally sends a confirmation message to the transmitter 402 confirming the decision made by the transmitter 402. In some embodiments, this confirmation message may be send in UCI. In some embodiments, the receiver 405 may have the authority to overrule the decision, and the overrule message would contain information regarding the alternate transmission scheme. At step 468, the transmitter 402 can then transmit data to the receiver 405 in the physical downlink shared channel (PDSCH) in the manner selected by the transmitter 402.

Providing the system with this adaptability may allow for improved performance over a wide range of system parameters.

An embodiment that will now be described is for sidelink, which pertains to communications between two UEs, where the decision is made at the UE considered to be the receiver of data being transmitted and the decision information is sent on a short-term basis.

Figure 4D:
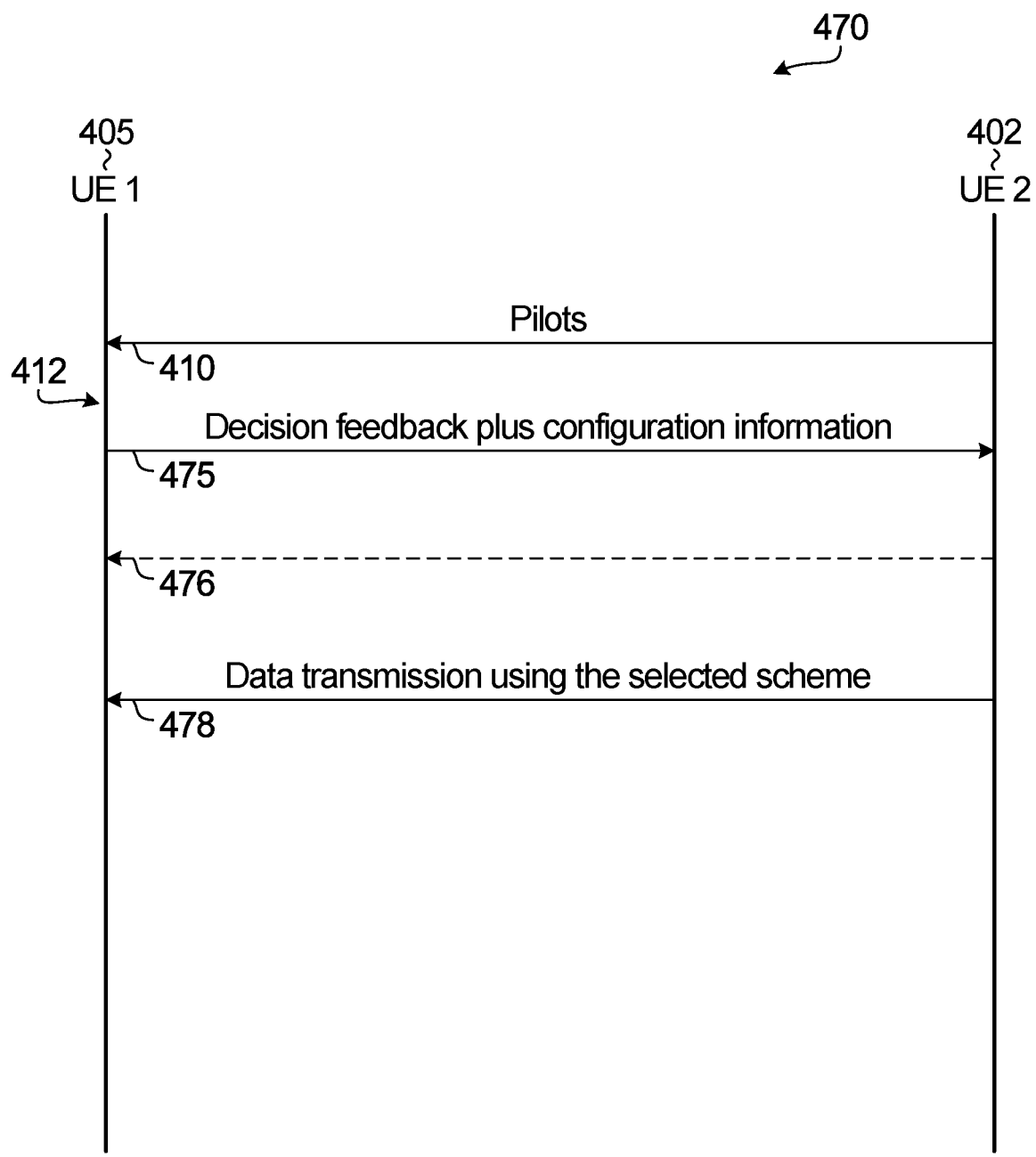
FIG. 4D is a signal flow diagram illustrating signaling between a first UE and a second UE for adaptively selecting a transmission scheme for SL according to an aspect of the application.

FIG. 4D illustrates an example of signalling that may occur between a receiver, which is a first UE, UE1, 405 and a transmitter, which is a second UE, UE2, 402, wherein the decision is made at the receiver.

At step 410, UE2 402 sends a reference signal (for example, a pilot) that allows UE1 405 to perform channel estimates for all indices, for example MAP indices for MBM and antenna indices for SM. At step 412, the receiver makes a decision as to the type of transmission scheme. In some embodiments, the decision making process involves using parameter values to estimate performance metrics and then selecting a transmission scheme based on the estimated performance metrics. The parameters may include system parameters and long-term channel statistics such as signal to noise ratio (SNR), the number of receive antennas, features of the channel such as channel correlation and coherence time, transmission rate and how many bits are transmitted through spatial vectors and conventional constellations. At step 475, UE1 405 sends decision feedback information to UE2 402 as to the decision made as to which transmission scheme is to be used, beamforming or a channel modulation transmission scheme such as MBM or SM or a hybrid selection. In the particular example shown, the feedback information is performed on a short-term basis and as such the feedback information can be sent in sidelink control information (SCI) messages. It should be understood that if the feedback information is sent on a long-term basis, the feedback may be sent in RRC. Also transmitted at step 475, UE1 405 may send configuration information to UE2 402, so UE2 402 can send the data in the manner selected by UE1 405, if confirmed by UE2 402, or an alternative manner if the recommendation is overruled. Therefore, if the transmission scheme is beamforming, the configuration information is used, in part, to configure the UE2 402 to be able to transmit data to the UE1 405 using beamforming. If the transmission scheme is MBM or SM, the configuration information is used, in part, to configure the UE2 402 to be able to transmit data to the UE1 405 using MBM or SM. The configuration information may be sent in SCI when the configuration information is considered to be transmitted on a short-term basis. The configuration information is specific to the transmission scheme and therefore may be different depending on the transmission scheme. For example, for MBM or SM, the configuration information may include some or all indices and the CQI corresponding to each index.

For beamforming, the configuration information may include a particular selected index and the CQI corresponding to the selected MAP. A further option may be the configuration information includes a hybrid selection of combinations of indices and the conventional constellations.

At step 476, optionally, UE2 402 can send a confirmation message for the decision and it might have further the ability to overrule the decision.

At step 478, UE2 402 can then transmit data to UE1 405 in an appropriate transmission resource in the manner selected by UE1 405, if confirmed by UE2 402, or alternative scheme if the receiver decision is overruled.

Other variations of this embodiment include the decision being made by the network instead or that the decision is recommended by the receiver, as opposed to explicitly selected.

In some embodiments, for any of DL, UL, SL or backhaul, the receiver may use a default transmission type, either beamforming or channel modulation transmission scheme, unless it is told specifically to use a different transmission type than the default transmission type. In such a scenario, channel estimation may still occur as described in the examples above, as needed. The receiver would then use a default transmission type. However, the transmitter may send a message that causes the receiver to disregard the default transmission type and use an alternative transmission type. Such embodiments may reduce the overhead, as by using a default transmission type, less overhead maybe needed to inform the receiver what transmission scheme will be used.

Providing the system with this adaptability would allow for better performance. Because this embodiment considers the current channel estimation while making the decision, the performance may be enhanced using this extra information.

In general the above embodiments and examples can be applied to various wireless communication systems.

Some of the embodiments and examples described above may also be applied to other applications and scenarios as well. A DL scenario between a base station and UE can be also extended to a link between a BS and a vehicle (internet of vehicles IoV). A sidelink scenario can be extended to operate between two vehicles or internet of things (IoT) applications. In general, any transmitter that is capable of changing the resulting channel vector at the receiver can benefit from this decision adaptation. The transmitter can even be an aerial transmitter as unmanned aerial vehicle (drones) or satellite, It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
receiving, by a first device, a reference signal for channel estimation;
transmitting, by the first device, feedback information regarding a transmission scheme selected from beamforming and channel modulation transmission scheme pertaining to data transmission between the first device and a second device remote from the first device; and
transmitting, by the first device, configuration information for the selected transmission scheme.

2. The method of claim 1, wherein the channel modulation transmission scheme is one of media based modulation (MBM) or spatial modulation (SM).

3. The method of claim 1, wherein at least one of the transmitting the feedback information or the transmitting configuration information comprises transmitting the feedback information or the configuration information in:
uplink control information (UCI);
downlink control information (DCI); and
radio resource control (RRC) messages.

4. The method of claim 1, wherein the transmitting the feedback information comprises at least one of:
i) a) deciding, by the first device, the selection of the transmission scheme; and
b) transmitting, by the first device, the selected transmission scheme;
ii) transmitting, by the first device, a recommended selection for the transmission scheme; or
iii) transmitting, by the first device, information for use in adaptively determining the transmission scheme.

5. The method of claim 1, wherein the configuration information pertaining to data transmission comprises:
for a channel modulation transmission scheme, some or all indices from a set of all possible indices of the second device and corresponding channel quality information (CQI);
for beamforming, a selected index from a set of all possible indices of the second device and corresponding CQI; or
a hybrid selection of indices, from a set of all possible indices of the second device, suitable for a channel modulation transmission scheme and conventional modulation.

6. The method of claim 1, wherein the transmitting configuration information is for one of:
uplink (UL) data transmission between the first device that is a base station and the second device that is a user equipment (UE);
downlink (DL) data transmission between the first device that is a UE and the second device that is a base station;

sidelink (SL) data transmission between the first device that is a UE and the second device that is another UE; or backhaul data transmission between the first device that is a base station and the second device that is another base station.

7. The method of claim 1 further comprising receiving, by the first device, at least one of:
confirmation regarding the transmission scheme;
a decision from the second device overruling a decision received from the first device; or
a decision from the second device based on the feedback information transmitted by the first device.

8. The method of claim 1, wherein the transmission scheme is selected based on one or more parameters of a plurality of parameters comprising:
signal-to-noise ratio (SNR);
number of receive antennas;
channel correlation;
coherence time; and
transmission rate.

9. An apparatus comprising:
a processor; and
a computer-readable medium, having stored thereon computer executable instructions, that when executed cause the apparatus to:
receive a reference signal for channel estimation;
transmit feedback information regarding an adaptively determined transmission scheme selected from beamforming and a channel modulation transmission scheme pertaining to data transmission between the apparatus and a second apparatus remote from the apparatus; and
transmit configuration information for the selected transmission scheme.

10. The apparatus of claim 9, wherein the channel modulation transmission scheme is one of media based modulation (MBM) or Spatial modulation (SM).

11. A method comprising:
transmitting, by a first device, a reference signal for channel estimation;
receiving, by the first device, feedback information regarding a transmission scheme selected from beamforming and a channel modulation transmission scheme pertaining to data transmission between the first device and a second device remote from the first device; and
receiving, by the first device, configuration information for the selected transmission scheme.

12. The method of claim 11, wherein the channel modulation transmission scheme is one of media based modulation (MBM) or Spatial modulation (SM).

13. The method of claim 11, wherein the at least one of the transmitting the feedback information or the transmitting configuration information comprises transmitting the feedback information or the configuration information in:
uplink control information (UCI);
downlink control information (DCI); and
radio resource control (RRC) messages.

14. The method of claim 11, wherein the receiving the feedback information comprises at least one of:
receiving, by the first device, the selected transmission scheme; or receiving, by the first device, a recommended selection for the transmission scheme; or
receiving, by the first device, information for use in adaptively determining the transmission scheme.

15. The method of claim 11, wherein the configuration information pertaining to data transmission comprises:
for a channel modulation transmission scheme, some or all indices from a set of all possible indices of the first device and corresponding channel quality information (CQI);
for beamforming, a selected index from a set of all possible indices of the first device and corresponding CQI; or
a hybrid selection of indices, from the set of all possible indices of the first device, suitable for a channel modulation transmission scheme and conventional modulation.

16. The method of claim 11, wherein the receiving configuration information pertaining to data transmission between the second device and the first device is for:
uplink (UL) data transmission between the first device that is a user equipment (UE) and the second device that is a base station;
downlink (DL) data transmission between the first device that is a base station and the second device that is a UE;
sidelink (SL) data transmission between the first device that is a UE and the second device that is another UE; or backhaul data transmission between the first device that is a base station and the second device that is another base station.

17. The method of claim 11 further comprising transmitting, by the first device, at least one of:
confirmation regarding the transmission scheme;
a decision overruling a decision received from the second device; or
a decision based on the feedback information received from the second device.

18. The method of claim 11, wherein the transmission scheme is selected based on one or more parameters of a plurality of parameters comprising:
signal-to-noise ratio (SNR);
number of receive antennas;
channel correlation;
coherence time; and
transmission rate.

19. An apparatus comprising:
a processor; and
a computer-readable medium, having stored thereon computer executable instructions, that when executed cause the apparatus to:
transmit a reference signal for channel estimation;
receive feedback information regarding a transmission scheme selected from beamforming and a channel modulation transmission scheme pertaining to data transmission between the apparatus and a second apparatus remote from the apparatus; and
receive configuration information for the selected transmission scheme.

20. The apparatus of claim 19, wherein the channel modulation transmission scheme is one of media based modulation (MBM) or Spatial modulation (SM).

* * * * *